Nov. 30, 1965  E. S. GANDRUD  3,220,369
ROW WHEEL FOR AGRICULTURAL IMPLEMENTS
Filed Oct. 27, 1964  2 Sheets-Sheet 1

INVENTOR.
EBENHARD S. GANDRUD
BY
Merchant, Merchant & Gould
ATTORNEYS

INVENTOR.
EBENHARD S. GANDRUD
BY
Merchant, Merchant & Gould
ATTORNEYS

United States Patent Office 3,220,369
Patented Nov. 30, 1965

3,220,369
ROW WHEEL FOR AGRICULTURAL IMPLEMENTS
Ebenhard S. Gandrud, % Gandy Co., Box 528, Owatonna, Minn.
Filed Oct. 27, 1964, Ser. No. 406,690
21 Claims. (Cl. 111—10)

This application is a continuation-in-part of my copending application, Serial No. 223,449, filed September 13, 1962, and entitled Row Wheel for Agricultural Implements.

This invention relates to improvements in earth working tools adapted to be used in connection with seed planting implements, and more particularly to a device of generally cylindrical form and including an annular series of successively operable earth working elements rotatably supported in predetermined positions with respect to the ground when the device is rolled thereover.

As illustrated in said co-pending application, it is highly desirable to provide, in following relationship to a seed planter, a rolling device incuding successively advancing earth working tool means which will, due to their predetermined angular arrangement, cut into the soil and, due to their constantly changing attitude during rolling movement of the device, operate to compact the soil over the newly planted seeds and to fluff the top portions of the soil or topsoil thereabove.

Heretofore, it has been the practice to employ a device known as a press wheel having a smooth metal or rubber tired rim, the purpose of which has been to merely compact a surface layer of soil over the planted seed. Other forms of press wheel attempted to break up the soil, these including a generally cylindrical drum of open work expanded metal form which would break up particles of the soil and compact some of the soil, but always radially downwardly from the top of the soil. Still others employed radial bars in a similar attempt to perform a like operation but always radially downwardly from the top. The resultant row or track left by these devices were substantially devoid of a fluffy layer of topsoil over the compacted soil therebeneath, hereafter designated as subsoil, thus lacking to a considerable extent the ability to receive and hold moisture for extended periods of time, and were subject to erosion in heavy rainfall.

I have found that, in providing a row wheel having a continuously operating series of axially elongated blades and interconnecting compacting portions, the transverse shape, angular positioning and longitudinal operable extent of each blade and interconnecting compacting portion is highly important. Of like importance is the rigidity with which the blades must be maintained from end to end of the row wheel to produce a row of desired width wherein the subsoil is uniformly packed over the full width of the row, and wherein the topsoil is uniformly fluffed over the full width of the row, to provide a generally level row which conserves moisture and is highly resistant to erosion.

It is an object of this invention to provide a soil treating roller having axially extending blade portions that are each displaced from a radius of the roller extending there through at a predetermined optimum angle for a given roller diameter, whereby the blade portions cut into the top portion of the soil, compact the subsoil there beneath, and cascade the topsoil generally upwardly and rearwardly over the compacted soil responsive to rolling action of the roller over the ground.

Another object of this invention is the provision of a soil treating roller that is extremely rigid in construction, efficient in operation and durable in use.

To the above ends, I provide a soil treating roller comprising a pair of axialy spaced disk-like wheels and a generally cylindrical ground engaging structure coaxial with the wheels and comprising a plurality of generally axially extending bars secured to the peripheral portions of the wheels and each formed to provide a plurality of axially extending generally radial digging and incorporating blade sections, alternate ones of which are disposed in spaced parallel relation to the others thereof, and soil compacting bridging sections connecting alternate ones of said blade sections. The alternate blade sections of each of said bars are rigidly secured to adjacent blade sections of adjacent ones of said bars, and the blade sections are each so disposed that a predetermined angle relative to the radius of the roller extending therethrough, so that the radially outer edges of the blade sections lead the radially inner edges thereof in the direction of rotation of the roller.

The above, and still further highly important objects and advantages of this invention will become apparent from the following detailed specification, appended claims and attached drawings.

Figures 4, 5:
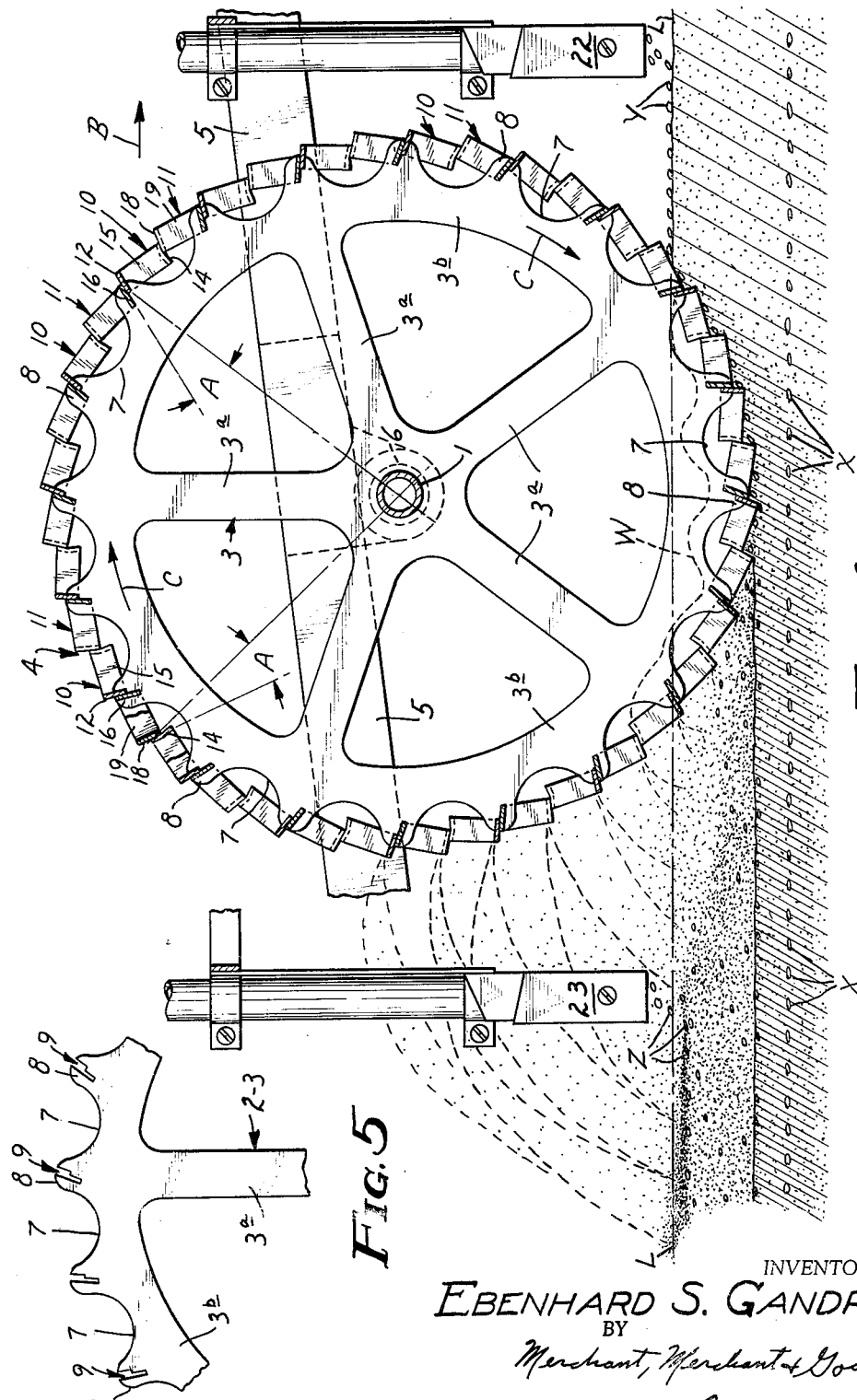
FIG. 4 is an enlarged transverse section taken on the line 4—4 of FIG. 1 and illustrating the operation of this invention.
FIG. 5 is a fragmentary view in elevation of a portion of one of the wheels of the soil treating roller.

Referring with greater detail to the drawings, the soil treating roller of this invention is shown as comprising an elongated shaft 1, a pair of spoked disk-like end flanges or wheels 2, rigidly mounted on the shaft 1, in axially spaced relationship, a central flange or wheel 3, rigidly secured to the shaft 1 intermediate the end wheels 2, the wheels 2 and 3 being substantially identical and including circumferentially spaced spokes 3a and an annular radially outer portion 3b, and a generally cylindrical open work structure 4, coaxial with the shaft 1 and rigidly secured to the wheels 2 and 3, as will be hereinafter described. Preferaby, the shaft 1 is suitably journaled in bearings on a pair of supporting bars 5, one of which is shown in FIG. 4, the supporting bars 5 being adapted to be secured to a seed planter or other agricultural implement, all as clearly shown and described in my above identified co-pending application. The shaft 1 is normally generally horizontally disposed and extends transversely of the direction of travel of the implement to which it is attached, so that the soil treating roller, otherwise designated as a row wheel, is caused to roll over the ground due to frictional engagement therewith.

Each of the disk-like wheels 2 and 3 are formed to provide tubular flanges 6 at their central portions, the flanges 6 sungly encompassing the shaft 1 and welded or otherwise rigidly secured thereto. The annular portion 3b of the wheels 2 and 3 are formed to provide circumferentially spaced radialy outwardly opening arcuate notches 7 and radial teeth 8, the teeth 8 being formed to provide generally radially outwardly opening slots or the like 9, see particularly FIG. 5.

The generally cylindrical structure 4 comprises a plurality of generally axially extending bars 10 and a like plurality of alternate bars 11, the bars 10 and 11 each being of greater width than thickness and each formed along lines extending across the width thereof to provide a plurality of axially extending generally radial digging and incorporating blade sections and soil compacting bridging sections connecting alternate ones of said blade sections. In other words, each bar 10 is formed to provid a central digging blade section 12 and opposite end blade sections 13 axially aligned with the central blade section 12, a pair of axially aligned blade sections 14 each disposed between the central blade section 12 and a different one of the end blade sections 13 and circumferentially spaced therefrom, and angularly displaced generally radial bridging sections 15 connecting the blade sections 14 to the blade sections 12 and 13. In like manner, each bar 11 is formed to provide axially aligned central and end blade sections 16 and 17 respectively and axially aligned blade sections 18 intermediate the central section 16 and end sections 17 and circumferentially spaced therefrom, the central blade section 16 and end blade sections 17 being connected to the alternate intermediate blade sections 18 by angularly displaced generally radial bridging sections 19.

Figure 1:
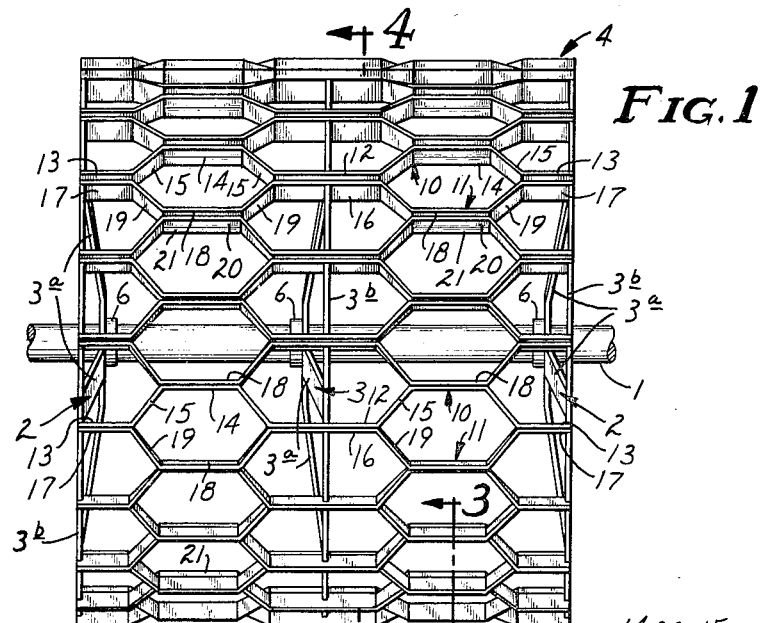
FIG. 1 is a view in side elevation of a soil treating roller constructed in accordance with this invention.
Figure 2:
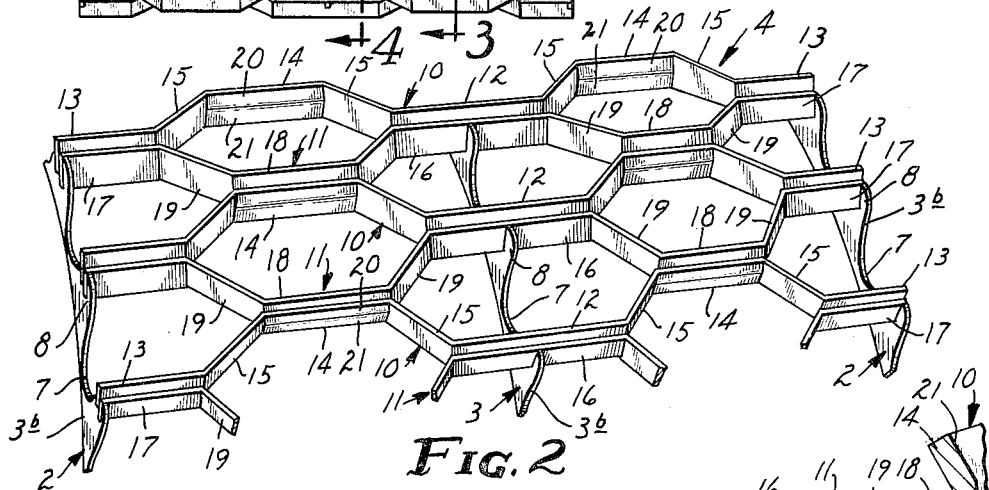
FIG. 2 is an enlarged fragmentary perspective showing a portion of the soil treating roller of FIG. 1.
Figure 3:
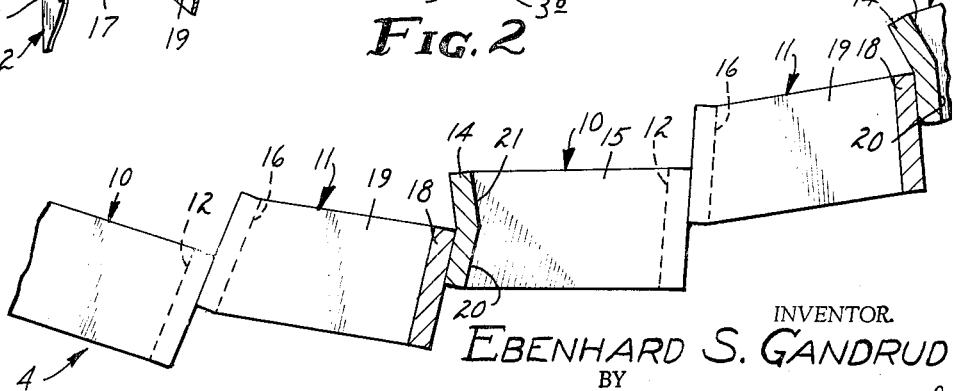
FIG. 3 is a still further enlarged fragmentary transverse section taken on the line 3—3 of FIG. 1.

As shown, the bars 10 and 11 each have their alternate blade sections disposed in overlapping face-to-face engagement with alternate blade sections of adjacent ones of the bars 10 and 11, overlapping and engaging pairs of the blade sections being rigidly secured together by spot welding or the like. As shown in FIGS. 2–4, each blade section overlaps approximately one-half of the width of an adjacent blade section whereby to provide axially extended incorporating blades having a generally radial width substantially greater than the generally radial width of each of the bridging sections 15 and 19. The axially outer ends of the end blade sections 13 and 17 are received in the slots 9 of the end wheels 2, it being noted with reference to FIG. 5 that the slots 9 are stepped to receive the overlapping portions of the end blade sections 13 and 17. In like manner, the overlapping central blade portions 12 and 16 are received in the stepped slots 9 of the central wheel 3, the bars being rigidly secured in the slots 9 in the central and end wheels 3 and 2 respectively, by welding or the like.

It will be noted that each of the blade sections 14 of the bars 10 are formed in cross-sectionally generally V-shape, to provide angularly displaced wing portions 20 and 21, the adjacent blade sections 18 being disposed in face-to-face engagement with the wing portions 20 of adjacent bars 10. The cross-sectionally V-shape of the blade sections 14 adds rigidity to those axially extending blade portions of the structure 4 that are not directly supported by the wheels 2 and 3.

It is important to note that, although the various blade sections have been above described as being generally radial, the blade sections 12–14 and 16–18 are, with the exception of the wing portions 21 of the blade sections 14, each angularly displaced from a radius of the roller extending therethrough. The angular displacement is such that the radially outer edges of the axial blade portions are disposed forwardly of the radially inner edges thereof in the direction of rotation of the roller. This angular displacement is indicated by A in FIG. 4, and may vary in accordance with the overall diameter of the roller or row wheel and in accordance with the normal speed of the implement to which the row wheel is attached. I have found that, by providing a row wheel of a diameter of approximately 16 inches, and traveling at a forward speed of approximately four to five miles an hour, the optimum angular displacement A is in the neighborhood of twenty-one degrees. In a row wheel of substantially smaller diameter, such as on the order of eight or ten inches in diameter, the angle A would be substantially reduced, depending upon the intended forward speed of the implement; and in the case of a row wheel or roller of substantially larger diameter such as, for instance, 24 to 30 inches, the angle A would be materially increased in view of the slower peripheral speed over that of a 16 inch diameter wheel, for instance. Thus, depending upon the diameter of the row wheel and the intended forward speed thereof, the angle A may be anywhere from substantially five degrees to substantially forty-five degrees.

In use, as the row wheel is rolled over tilled and seeded land in a forward direction, indicated by the arrow B, the row wheel rotates in the direction of the arrows C, see FIG. 4, the weight of the row wheel and apparatus attached thereto causing the wheel to work its way into the ground to a depth below the ground level, as shown in FIG. 4. As the wheel rolls over the ground the blades cut into the topsoil, exerting an initial downward cutting action and compacting the soil there below over and around the newly planted seeds, indicated at X, the bridging sections 15 and 19 operating substantially entirely as soil compacting means. As the wheel continues its rolling movement, the attitude of each axially extended blade section changes relative to the ground, this changing attitude and the upward movement of other blades away from the compacted subsoil tending to pull the downwardly moving entering blade sections into the ground. Further, this changing attitude of the blade and bridging sections, during the ground entering phase of movement, causes the forwardly and downwardly facing surfaces of the blades to exert additional generally downwardly compacting pressure on the subsoil therebelow. It will be appreciated that some of the top portion of the soil enters the interior of the roller between the blade sections and, due to rotation of the roller, is agitated, the agitated or turbulent state of the soil within the roller being indicated generally by the irregular dotted line W in FIG. 4. As the various blade sections move upwardly out of the ground, much of the topsoil is carried upwardly thereby, the above mentioned angular displacement of the blade sections causing the loose topsoil to be cascaded upwardly and generally rearwardly relative to the forward motion of the roller, to fill up the ground rearwardly of the roller in a loose fluffy condition, free of lumps or clods. The initial cutting of the soil by the entering blades and bridging sections breaks up large clumps or clods which may be present, the compacting of the subsoil creating capillary soil water attraction over the entire width of the row covered by the roller or row wheel, the loose fluffy topsoil left by the wheel protecting the subsoil from undue moisture evaporation, and providing a flat area which readily absorbs moisture from rainfall, thus materially reducing the likelihood of soil erosion. In FIG. 4, the ground level of the relatively loose tilled and seeded soil is shown by the line L—L. It will be noted that the level of loose sloppy top soil rearwardly of the roller 2 is slightly lower than that of the level indicated at L—L, due to the compacting of the subsoil as shown by the relatively close cross-hatching below the level of the roller 4.

As set forth in my co-pending application, above identified, the row wheel is well adapted for use in incorporating chemicals into the earth for destroying weeds and harmful insects. With reference to FIG. 4, it will be seen that a pair of chemical distributing devices may be supported by the arms 5, these devices being indicated at 22 and 23, the former thereof being adapted to dispense granular chemical Y and the latter thereof dispensing granular chemical Z. For the purpose of the present example, the chemical Y may be assumed to be commercial insecticide, and the granules Z containing one or more weed killing agents. The chemical distributing devices are preferably of the type disclosed in my prior U.S. Letters Patent No. 2,990,186 and entitled "Device for Spreading Granular Material." As shown in FIG. 4, the granules Y are incorporated into the soil by action of the digging blades and soil compacting bridging portions 15 and 19, the granules Z being discharged into the cascading topsoil rearwardly of the row wheel, whereby to be incorporated into the fluffed topsoil. Thus, the chemicals are thoroughly incorporated into the soil above the planted seed whereby to be retained therein against wind and rain erosion and protected against volatilization of the active ingredients by the rays and heat of the sun. It will be appreciated that well known and conventional liquid chemical applicators may be used in place of the devices 22 and 23, with comparable effectiveness, the liquid chemicals being incorporated into the soil in the same manner as the dry granular materials.

While I have shown and described a commercial embodiment of my row wheel or soil treating roller, it will be understood that the same is capable of modification without departure from the spirit and scope of the invention, as defined in the claims.

I claim:

1. In a soil-treating roller:
   (a) a pair of axially spaced disk-like wheels,
   (b) a generally cylindrical and rigid open ground-engaging rotary structure co-axial with said wheels which includes a plurality of seperate bar members each having circumferentially offset and opposed blade portions connected in overlapping face-to-face engagement to provide axially spaced digging incorporating bar portions,
   (c) the blade sections of each row thereof being axially staggered relative to the blade sections of adjacent rows thereof,
   (d) said structure further including soil compacting bridging sections connecting alternate ones of said blade sections,
   (e) said blade sections each being disposed at a predetermined angle to a radius of the roller extending therethrough, the radially outer edges of said blade sections being disposed forwardly of the radially inner edges thereof in the direction of rotation of the roller,
   (f) said angle being such that during rolling movement of the roller over the ground, said blade sections enter the soil in an edgewise downward direction to cause said blade and bridging sections to compact the subsoil, the blade sections during subsequent upward movement away from the ground cascading the topsoil generally upwardly and rearwardly to provide a smooth fluffy layer of topsoil over the compact subsoil,
   (g) and means for rigidly connecting said ground-engaging structure to said wheels and including portions of said wheels engaging adjacent ones of said blade sections and rigidly supporting the same at said predetermined angle of each thereof.

2. In a soil treating roller:
   (a) a pair of axially spaced disk-like wheels,
   (b) a generally cylindrical open ground-engaging structure coaxial with said wheels and including a plurality of circumferentially spaced axially extending rows of axially spaced digging and incorporating blade sections,
   (c) the blade sections of each row thereof being axially staggered and in overlapping generally face-to-face engagement relative to the blade sections of adjacent rows thereof,
   (d) said structure further including soil compacting bridging sections connecting alternate ones of said blade sections,
   (e) said blade sections each being disposed at a predetermined angle of between five degrees and forty-five degrees to a radius of the roller extending therethrough, the radially outer edges of said blade sections being disposed forwardly of the radially inner edges thereof in the direction ofr rotation of the roller,
   (f) said blades entering the soil, during forward rolling movement of the roller, in an edgewise downward direction to cause said blade and bridging sections to compact the subsoil, the blade sections during subsequent upward movement away from the ground cascading the top soil generally upwardly and rearwardly to provide a smooth fiuffy layer of top soil over the compacted subsoil,
   (g) and means for rigidly connecting said ground engaging structure to said wheels and including portions of said wheels engaging adjacent ones of said blade sections and rigidly supporting the same at said predetermined angle of each thereof.

3. The soil treating roller of claim 2 in which said blade sections are each disposed at an angle of substantially twenty one degrees to said radius extending therethrough.

4. In a soil treating roller:
   (a) a pair of axially spaced disk-like wheels,
   (b) a generally cylindrical open ground-engaging structure coaxial with said wheels and comprising a plurality of generally axially extending bars secure to and laterally supported by edge portions of said wheels,
   (c) said bars being of greater width than thickness and each formed along lines extending across the width thereof to provide a plurality of axially extending generally radial digging and incorporating blade sections, alternate ones of which are connected in overlapping face-to-face engagement and disposed in circumferentially spacer parallel relationship to the others thereof, and soil compacting bridging sections connecting alternate ones of said blade sections,
   (d) alternate blade sections of each bar being rigidly connected to alternate blade sections of adjacent bars,
   (e) said blade sections each being disposed at a predetermined angle to a radius of the roller extending therethrough, the radially outer edges of said blade sections being disposed forwardly of the radially inner edges thereof in the direction of rotation of the roller,
   (f) said angle being such that during rolling movement of the roller over the ground, said blade sections being transversely supported by said edge portions of said wheels enter the soil in an edgewise downward direction to cause said blade and bridging sections to compact the subsoil, the blade sections during subsequent upward movement away from the ground cascading the topsoil generally upwardly and rearwardly to provide a smooth fluffy layer of topsoil over the compacted subsoil.

5. In a soil treating roller:
   (a) a pair of axially spaced disk-like wheels,
   (b) a generally cylindrical open ground-engaging structure coaxial with said wheels and comprising a plurality of generally axially extending bars secured to the peripheral edge portions of said wheels,
   (c) said bars being of greater width than thickness and each formed along lines extending across the width thereof to provide a plurality of axially extending generally radial digging and incorporating blade sections, alternate ones of which are disposed in circumferentially spaced parallel relationship to others thereof, and soil compacting bridging sections connecting alternate ones of said blade sections,
   (d) alternate blade sections of each bar being disposed in overlapping face-to-face engagement with alternate blade sections of adjacent bars and secured together in said face-to-face engagement,
   (e) said blade sections each being disposed at a predetermined angle to a radius of the wheel extending therethrough, the radially outer edges of said blade sections being disposed forwardly of the radially inner edges thereof in the direction of rotation of the roller, (f) said angle being such that during rolling movement of the roller over the ground, said blades enter the soil in an edgewise downward direction to cause said blade and bridging sections to compact the subsoil, the blade sections during subsequent upward movement away from the ground cascading the topsoil generally upwardly and rearwardly to provide a smooth fluffy layer of topsoil over the compacted subsoil.

6. The soil treating roller of claim 5 in which said blade sections are each displaced at an angle of substantially twenty-one degree from the radius of the wheel extending therethrough.

7. The soil treating roller of claim 5 in which at least some of the blade sections of alternate bars are cross-sectionally generally V-shaped to provide a pair of angularly displaced wing portions, adjacent blade sections of adjacent ones of said bars each being disposed in face-to-face engagement with one of the wing portions of a different one of said generally V-shaped blade sections.

8. In a soil treating roller:
(a) a pair of axially spaced disk-like wheels having circumferentially spaced generally radially outwardly opening slots in the peripheral edges of said wheels,
(b) a generally cylindrical open ground-engaging structure coaxial with said wheels and including a plurality of circumferentially spaced axially extending rows of axially based digging and incorporating blade sections,
(c) the blade sections of each row thereof being axially staggered relative to the blade sections of adjacent rows thereof and said blade sections of adjacent rows being disposed in overlapping face-to-face engagement,
(d) said structure further including soil compacting bridging sections connecting alternate ones of said blade sections,
(e) said blade sections and slots each being disposed at a predetermined angle to a radius of the roller extending therethrough, the radially outer edges of said blade sections and the radially outer ends of said slots being disposed forwardly of the radially inner edges and radially inner ends of the blade sections and slots respectively in the direction of rotation of the roller,
(f) said angle being such that during rolling movement of the roller over the ground, said blades enter the soil in an edgewise downward direction to cause said blades and bridging sections to compact the subsoil, the blade sections during subsequent upward movement away from the ground cascading the topsoil generally upwardly and rearwardly to provide a smooth fluffy layer of topsoil over the compacted subsoil,
(g) the blade sections at opposite end portions of said roller being seated in said slots and supported thereby at said predetermined angle of each thereof.

9. In a soil treating roller:
(a) a pair of axially spaced disk-like wheels having circumferentially spaced generally radially outwardly opening slots in the peripheral edges of said wheels,
(b) a generally cylindrical open ground-engaging structure coaxial with said wheels and comprising a plurality of generally axially extending bars of greater width than thickness,
(c) said bars being formed along lines extending across the width thereof to provide a plurality of axially extending generally radial digging and incorporating blade sections, alternate ones of which are disposed in circumferentially spaced parallel relationship to the others thereof, and soil compacting bridging sections connecting alternate ones of said blade sections,
(d) alternate blade sections of each bar being rigidly connected in overlapping face-to-face engagement to alternate blade sections of adjacent bars,
(e) said blade sections and said slots each being disposed at a predetermined angle to a radius of the roller extending therethrough, the radially outer edges of said blade sections and the radially outer ends of said slots being disposed forwardly of the radially inner edges and radially inner ends of the blade sections and the slots respectively in the direction of rotation of the roller,
(f) the blade sections at opposite end portions of said roller being seated in said slots and supported thereby at said predetermined angles thereof,
(g) said angle being such that during rolling movement of the roller over the ground, said blades enter the soil in an edgewise downward direction to cause said blade and bridging sections to compact the subsoil, the blade sections during subsequent upward movement away from the ground cascading the top soil generally upwardly and rearwardly to provide a smooth fluffy layer of topsoil over the compacted subsoil.

10. The soil treating roller of claim 9 in which said alternate blade sections of adjacent bars are disposed in overlapping face-to-face engagement.

11. The soil treating roller of claim 9 in which at least some of the blade sections of alternate bars are cross-sectionally generally V-shaped to provide a pair of angularly displaced wing portions, adjacent blade sections of adjacent ones of said bars each being disposed in face-to-face engagement with one of the wing portions of a different one of said generally V-shaped blade sections.

12. In a soil treating roller:
(a) a pair of axially spaced end flanges each having, a central hub portion for mounting on a common axial shaft, and an annular outer edge portion,
(b) and a generally cylindrical ground-engaging structure joining said flanges and comprising a plurality of radial blades each having inner and outer edges and generally axially extending leading and trailing blade portions spaced relative to the direction of rotation of the roller and angularly displaced bridging portions connecting ends of said leading and trailing portions,
(c) adjacent ones of said leading and trailing edge portions being disposed in overlapping generally face-to-face engagement in a direction axially of said roller,
(d) said secured leading and trailing blade portions being angularly displaced relative to a radius of said roller extending therethrough and in a direction in which the radially outer edges of said leading and trailing portions precede the radially inner edges thereof in the direction of rotation of said roller, providing axially spaced blade portions of greater width than said intermediate connecting bridging portions.

13. In a soil treating roller,
(a) a pair of axially spaced end flanges each having, a central hub portion for mounting on a shaft, and an annular outer edge portion,
(b) and a generally cylindrical ground-engaging structure comprising a plurality of generally axially extending generally radial blades, each blade having radially inner and outer edges and circumferentially and axially spaced axially extending leading and trailing portions relative to the direction of said roller and angularly displaced bridging portions connecting the ends of said axially extending leading and trailing portions,
(c) adjacent ones of said blade portions being disposed in overlapping generally face-to-face secured engagement in a direction axially of said roller,
(d) said blades being also secured at their opposite end portions to said annular flange portion,
(e) said secured leading and trailing portions being angularly displaced relative to a radius of said roller extending therethrough and in a direction in which the radially outer edges of said leading and trailing portions precede the radially inner edges thereof in the direction of rotation of said roller.

14. In a soil treating roller,
(a) a mounting shaft adapted to be journalled in a supporting structure for rotation on a horizontal axis,
(b) a pair of axially spaced end flanges rigidly mounted on said shaft for common rotation therewith and each having a central hub portion, an annular outer edge portion and circumferentially spaced spokes connecting said hub and outer edge portions,
(c) and a generally cylindrical ground-engaging structure comprising a plurality of generally axially extending generally radial blades, each blade having radially inner and outer edges and circumferentially and axially spaced axially extending leading and trailing portions provide with inner and outer edges relative to the direction of rotation of said roller and intermediate angularly displaced bridging portions connecting ends of said axialy extending leading and trailing portions,
(d) adjacent ones of said blades having said leading and trailing portions disposed in overlapping generally face-to-face secured engagement in a direction axially of said roller,
(e) said overlapping and secured blades being also secured at their opposite end portions to said annular flange portions, and each pair of secured blade portions being angularly displaced relative to a radius of said roller extending therethrough and in a direction relative to the direction of rotation of said roller to dispose the leading ones of said axially extending blade portions of each blade radially inwardly relative to the trailing ones thereof and in partial face-to-face engagement with the trailing portions of a preceding blade anchored thereto.

15. For use with a seed planter involving, a mobile frame, a trailing arm on said frame, feeding devices operatively associated with said trailing arm;
(a) a soil treating roller journalled on the rear end of said trailing arm and including,
(b) a shaft having a horizontal axis extending transversely of the direction of movement of said roller,
(c) a pair of axially spaced flanges on said shaft and each having an annular outer edge portion,
(d) and a generally cylindrical ground-engaging structure comprising a plurality of generally axially extending generally radial blades, each blade having radially inner and outer edges and circumferentially and axially spaced laterally offset and elongated leading and trailing portions relative to the direction of rotation of said roller and angularly disposed bridging portions connecting said axialy spaced leading and trailing portions,
(e) adjacent ones of said blades having said offset portion disposed in overlapping generally face-to-face secured engagement in a direction axially of said roller,
(f) said overlapping and secured adjacent blades being also secured at their opposite end portions to said annular flange portions,
(g) said secured leading and trailing portions of adjacent blades being angularly displaced relative to a radius of said roller extending therethrough and in a direction in which the radially outer edges of said leading and trailing portions precede the radially inner edges thereof in the direction of rotation of said roller.

16. For use with a seed planter involving, a mobile frame, a trailing arm on said frame, and furrowing, seeding and furrow-closing devices operatively associated with said trailing arm:
(a) a row wheel journalled on the rear end of said trailing arm and including,
(b) a shaft having a horizontal axis extending transversely of the direction of movement of the planter,
(c) a pair of axially spaced flanges on said shaft and each having an annular outer edge portion,
(d) and a generally cylindrical ground engaging structure comprising a plurality of generally axially extending generally radial blades, each blade having radially inner and outer edges and circumferentially and axially spaced axially extending leading and trailing portions with inner and outer edges relative to the direction of rotation of said wheel and angularly displaced bridging portions connecting the ends of said axially extending leading and trailing portions,
(e) adjacent ones of said blades having their leading and trailing portions secured in partial face-to-face engagement in a direction axially of said row wheel,
(f) said blades being secured at their opposite ends to said annular flange portions, and each angularly displaced relative to a radius of said wheel extending therethrough and in a direction relative to the direction of rotation of said wheel to dispose the leading ones of said axially extending blade portions of each blade radially inwardly relative to the trailing ones thereof,
(g) the leading portions of each blade being secured in face-to-face engagement with the trailing portion of a preceding blade.

17. For use with a seed planter involving, a mobile frame, a trailing arm on said frame, and furrowing, seeding and furrow-closing devices operatively associated with said trailing arm;
(a) a row wheel for supporting the rear end of said trailing arm and including,
(b) a shaft journalled to the rear end portion of said trailing arm for rotation on a horizontal axis extending transversely of the direction of movement of the planter,
(c) a pair of axially spaced flanges secured to said shaft and having annular outer edge portions,
(d) and a generally cylindrical ground-engaging structure comprising a plurality of generally axially extending radial blades, each blade having radially inner and outer edges and circumferentially and axially spaced laterally off-set and elongated leading and trailing portions with inner and outer edges relative to the direction of rotation of said wheel and intermediate angularly displaced portions connecting said axially extending leading and trailing portions,
(e) adjacent ones of said blades having said offset portions disposed in overlapping generally face-to-face secured engagement in a direction axially of said row wheel,
(f) said blades being also secured at their opposite ends to said annular flange portions, and each angularly displaced relative to a radius of said wheel extending therethrough and in a direction relative to the direction of rotation of said wheel to dispose the leading ones of said axially extending blade portions of each blade radially inwardly relative to the trailing ones thereof.

18. The structure defined in claim 12 in further combination with means for distributing granular material adjacent one side of said roller including, conduit means extending generally downwardly and having a discharge opening at its lower end portion, and means mounting said conduit for discharge of material adjacent and in the path traveled by said roller.

19. The structure defined in claim 18 in further combination with means mounting the discharge end portion of said conduit rearwardly of said roller, whereby material discharged by said conduit is incorporated with the surface portion of the ground elevated and cascaded rearwardly by the generally cylindrical blade structure of said roller during movement of the roller over the ground.

20. An earth working drum or row wheel having a cylindrical open working face comprising a plurality of elongated and generally axially extending circumferentially spaced earth working blade portions, each blade portion having at one end thereof an axially offset angularly disposed bar portions, and adjacent ones of said blade portions being connected through their length in overlapping face-to-face contact and at an angle to a radius line drawn therethrough, whereby to transversely strengthen each blade portion between the ends thereof.

21. A device as in claim 20 wherein said connected blade portions being of materially greater width than said bar portions connecting said blade portions.

References Cited by the Examiner
UNITED STATES PATENTS

| | | | |
|---|---|---|---|
| 221,640 | 11/1879 | Whitcomb. | |
| 1,839,000 | 12/1931 | Phan-Quang | 172—121 X |
| 2,965,053 | 12/1960 | Gruber | 111—10 |
| 3,119,314 | 1/1964 | Schiel | 172—554 X |

ABRAHAM G. STONE, *Primary Examiner.*

W. A. SMITH, III, *Examiner.*